(12) United States Patent
Odry et al.

(10) Patent No.: US 7,949,162 B2
(45) Date of Patent: May 24, 2011

(54) SYSTEM AND METHOD FOR SOLID COMPONENT EVALUATION IN MIXED GROUND GLASS NODULES

(75) Inventors: Benjamin Odry, West New York, NJ (US); Li Zhang, Skillman, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 956 days.

(21) Appl. No.: 11/836,991

(22) Filed: Aug. 10, 2007

(65) Prior Publication Data

US 2008/0040083 A1 Feb. 14, 2008

Related U.S. Application Data

(60) Provisional application No. 60/822,284, filed on Aug. 14, 2006.

(51) Int. Cl.
*G06K 9/00* (2006.01)
(52) U.S. Cl. ....................................................... 382/128
(58) Field of Classification Search .......... 382/128–133; 128/922; 250/584; 378/4, 5, 21, 62, 63
See application file for complete search history.

(56) References Cited

U.S. PATENT DOCUMENTS

| | | | | |
|---|---|---|---|---|
| 5,544,254 | A * | 8/1996 | Hartley et al. ................. | 382/108 |
| 5,583,659 | A * | 12/1996 | Lee et al. ...................... | 358/3.13 |
| 6,466,687 | B1 * | 10/2002 | Uppaluri et al. ............... | 382/128 |
| 6,728,334 | B1 * | 4/2004 | Zhao ................................ | 378/62 |
| 6,819,790 | B2 * | 11/2004 | Suzuki et al. .................. | 382/156 |
| 2002/0164061 | A1 * | 11/2002 | Paik et al. ....................... | 382/131 |
| 2005/0002548 | A1 * | 1/2005 | Novak et al. ................... | 382/128 |
| 2005/0063578 | A1 * | 3/2005 | Zhang et al. ................... | 382/128 |
| 2005/0254697 | A1 * | 11/2005 | Zhang et al. ................... | 382/131 |
| 2006/0093216 | A1 * | 5/2006 | Odry .............................. | 382/173 |
| 2006/0120585 | A1 * | 6/2006 | Zhang et al. ................... | 382/131 |
| 2007/0098242 | A1 * | 5/2007 | Wiemker et al. ............... | 382/131 |
| 2008/0002873 | A1 * | 1/2008 | Reeves et al. .................. | 382/133 |
| 2008/0050020 | A1 * | 2/2008 | Romsdahl et al. ............. | 382/199 |

OTHER PUBLICATIONS

Agam et al. ("Vessel Tree Reconstrction in Thotacic CT Scans With Application to Nodule Detection", IEEE Transactions of Medical Imaging, vol. 24, No. 4, Apr. 2005).*

* cited by examiner

*Primary Examiner* — Matthew C Bella
*Assistant Examiner* — Shervin Nakhjavan

(57) ABSTRACT

A method for segmenting a solid component (SC) in a ground glass nodule (GGN) includes providing a digitized image that includes a segmented GGN, the image comprising a plurality of intensities corresponding to a 3-dimensional grid of points, computing an intensity threshold that distinguishes a high intensity solid component of the GGN from a low intensity non-solid component, and applying the intensity threshold to identify a SC of the GGN and to identify regions of interest around the GGN, detecting whether or not a region of interest is a vessel, calculating a model for a detected vessel based on a radius and orientation of the vessel, and removing from the GGN segmentation all points that belong to both the model and the SC inside the GGN, and verifying whether a structure resulting from excluding the points qualifies as an SC.

21 Claims, 13 Drawing Sheets

SYSTEM AND METHOD FOR SOLID COMPONENT EVALUATION IN MIXED GROUND GLASS NODULES

CROSS REFERENCE TO RELATED UNITED STATES APPLICATIONS

This application claims priority from "Solid Components Evaluation in Mixed Ground Glass Nodules with Vessel Analysis in MSCT images", U.S. Provisional Application No. 60/822,284 of Odry, et al., filed Aug. 14, 2006, the contents of which are herein incorporated by reference.

TECHNICAL FIELD

This disclosure is directed to the automated segmentation and estimation of the solid component percentage within a segmented ground glass lung nodule.

DISCUSSION OF THE RELATED ART

Multi-Slice Computed Tomography (MSCT) imaging of the lungs allow for detection and follow-up of very small lesions including solid and ground glass nodules (GGNs). The increasingly wide use of MSCT allows for better characterization of small sized structures within the lungs, and consequently helps provide better detection and diagnosis of early lung cancer. Lung nodules can be divided in two categories: solid nodules and Ground Glass Nodules (GGNs), which can be further grouped into pure GGNs with only low-density components and mixed or sub-solid GGNs, which contain both low-density and solid components. Recent research showed that GGNs with solid components were highly associated with malignancy, and the presence and percentage of a solid component (SC) is an important feature for nodule characterization. While the size of solid components in GGNs has traditionally been measured manually to obtain diameters from 2D images, it would be desirable to develop an automatic method to measure solid components and GGNs by volume. The density of the SC is in most cases similar to that of vessels, making it difficult to differentiate by using a simple threshold. Due to their characteristically slow growth rate, GGNs are typically monitored with multiple follow-up scans, making measurement of the volume of both solid and non-solid component especially desirable.

SUMMARY OF THE INVENTION

Exemplary embodiments of the invention as described herein generally include methods and systems for segmenting dense structures from mixed GGNs, evaluating whether a vessel is connected or passing through, verifying whether the segmented structure qualifies as SC, and estimating the SC percentage within a segmented GGN. An SC algorithm according to an embodiment of the invention first segments out the solid structures, while excluding any vessels passing near or through the nodule. Then a gradient distribution analysis around solid structures validates the presence or absence of SC. A method according to an embodiment of the invention can provide fast, consistent and repeatable computation of the SC ratio, and will able to evaluate the likelihood of malignancy of GGNs, especially as they are followed over time.

A method according to an embodiment of the invention was tested on tested 50 GGNs, split between three groups: 15 GGNs with SC, 15 GGNs with a solid nodule added to simulate SC, and 20 GGNs without SC. With three defined satisfaction levels for the segmentation (A: succeed, B: acceptable, C: failed), the first group resulted in 60% with score A, 40% with score B, 0% with score C. The second group resulted in 66.7% with score A and 33.3% with score B. In testing the first and 3rd groups, SC were correctly detected in all cases where it was present (sensitivity of 100%) and the absence of SC was correctly determined in 15 out of 20 cases (specificity 75%).

According to an aspect of the invention, there is provided a method for segmenting a solid component (SC) in a ground glass nodule (GGN), including providing a digitized image that includes a segmented GGN, said image comprising a plurality of intensities corresponding to a 3-dimensional grid of points, computing an intensity threshold that distinguishes a high intensity solid component of said GGN from a low intensity non-solid component, and applying said intensity threshold to identify a SC of said GGN and to identify regions of interest around the GGN, detecting whether or not a region of interest is a vessel, calculating a model for a detected vessel based on a radius and orientation of said vessel, and removing from said GGN segmentation all points that belong to both the model and said SC inside said GGN, and verifying whether a structure resulting from excluding said points qualifies as an SC.

According to a further aspect of the invention, computing an intensity threshold includes initializing a low intensity threshold and a high intensity threshold from an intensity histogram of said GGN, calculating a mid-value as an average of said low intensity threshold and said high intensity threshold, adjusting said low intensity threshold according to $$\frac{\sum_{i=\text{minI}}^{\text{midv}-1} iH(i)}{\sum_{i=\text{minI}}^{\text{midv}-1} H(i)},$$

and said high intensity threshold according to $$\frac{\sum_{i=\text{midv}}^{\text{maxI}} iH(i)}{\sum_{i=\text{midv}}^{\text{maxI}} H(i)},$$

wherein midv is said mid-value, i is an image intensity value, minI and maxI are minimum and maximum image intensities within the GGN segmentation, and H(i) is a GGN histogram of size (maxI−minI+1), and repeating said steps of calculating a mid-value and adjusting said low and high intensity thresholds until said mid-value converges, wherein said mid-value is an intensity threshold for said SC.

According to a further aspect of the invention, detecting whether or not a region of interest is a vessel includes calculating an elongatedness of each region of interest labeled as a possible vessel, and comparing said elongatedness parameter for said region to a pre-determined threshold, wherein if said region is determined to be a vessel, verifying whether or not said region is connected to the GGN, and eliminating said region from consideration if it has no connection to the GGN.

According to a further aspect of the invention, the elongatedness is computed as an aspect ratio of a length and width of a rectangle that bounds said labeled region.

According to a further aspect of the invention, the elongatedness is computed from $$\frac{\text{Area}}{(2r)^2},$$

wherein Area is a region area and r is a number of erosions needed for the region to disappear.

According to a further aspect of the invention, calculating a model for a detected vessel includes determining a radius and orientation of said detected vessel, defining a starting point from a center of gravity of a neighborhood of vessel points near said GGN, projecting a centerline from said starting point towards said GGN along said orientation direction, and including in said model those points surrounding the center line within said radius.

According to a further aspect of the invention, the radius is computed from a maximum value of a distance-to-background map of said detected vessel, and said orientation is determined from a largest eigenvalue of a (3×3) covariance matrix $c_{ij}$ of vessel points.

According to a further aspect of the invention, the method includes, for each 2D slice in said model, evaluating a remaining region around the model for inclusion in said model based on whether said remaining region touches said model, and on the number of pixels defining said remaining region.

According to a further aspect of the invention, verifying whether a resulting structure qualifies as an SC includes obtaining a boundary contour $C=\{p_i, i=1, \ldots, n\}$ of said solid component; defining a profile $L_i$ for $p_i$ as $L_i=\{q_j | \overrightarrow{q_j p_i} \perp C$ and $\|\overrightarrow{q_j p_i}\| \leq d, j=1, \ldots, m\}$, wherein $\overrightarrow{q_j p_i}$ is a vector from $q_j$ to $p_i$, $\|\overrightarrow{q_j p_i}\|$ is the magnitude of vector $\overrightarrow{q_j p_i}$, and d is a half length of the profile, calculating an image intensity gradient $\nabla I(q_j)$ for each point $q_j$, calculating a maximum gradient $g(p_i)$ over $L_i$ from $$g(p_i) = \underset{q_j \in L_i}{\operatorname{argmax}}(\nabla I(q_j)),$$

calculating a median value for the gradient $g(p_i)$ on all boundary points $p_i$, wherein if said median is greater than a pre-defined threshold, said resulting structure is confirmed as a solid component.

According to another aspect of the invention, there is provided a method for segmenting a solid component (SC) in a ground glass nodule (GGN), including providing a digitized image that includes a segmented GGN, said image comprising a plurality of intensities corresponding to a 3-dimensional grid of points, computing an intensity threshold that distinguishes a high intensity solid component of said GGN from a low intensity non-solid component, initializing all points in the GGN as SC, using said intensity threshold to label the SC of the GGN from the non-SC part, using said intensity threshold to label regions of interest around the GGN as possible vessels, calculating an elongatedness of each region labeled as a possible vessel, comparing said elongatedness parameter for said region to a pre-determined threshold, wherein if said region is determined to be a vessel, verifying whether or not said region is connected to the GGN, and eliminating said region from consideration if it has no connection to the GGN.

According to a further aspect of the invention, the method includes calculating a radius and orientation of said vessel, defining a model starting point from a center of gravity of a neighborhood of vessel points near said GGN, projecting a model centerline from said starting point towards said GGN along said orientation direction, including in said model those points surrounding a center line within said radius, and removing from said GGN segmentation all points that belong to both the model and said SC inside said GGN.

According to a further aspect of the invention, the method includes estimating a gradient distribution between said high intensity component and said low intensity component of said GGN along a boundary contour of said GGN, wherein if a median value of said gradient is greater than a pre-defined threshold, verifying said resulting structure as a solid component.

According to another aspect of the invention, there is provided a program storage device readable by a computer, tangibly embodying a program of instructions executable by the computer to perform the method steps for segmenting a solid component (SC) in a ground glass nodule (GGN).

DETAILED DESCRIPTION OF EXEMPLARY EMBODIMENTS

Figure 1:
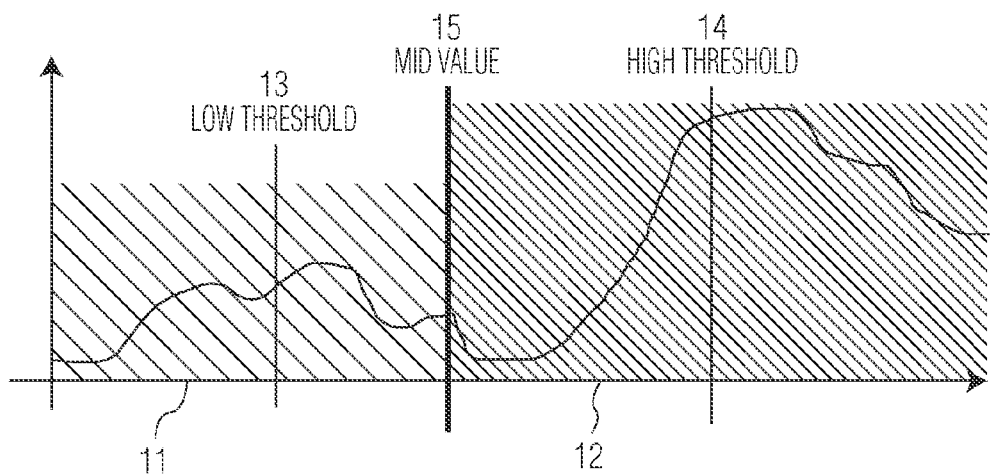
FIG. 1 illustrates a GGN histogram optimization according to an embodiment of the invention.

Exemplary embodiments of the invention as described herein generally include systems and methods for the automated segmentation and estimation of the solid component percentage within a segmented ground glass lung nodules.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 8:
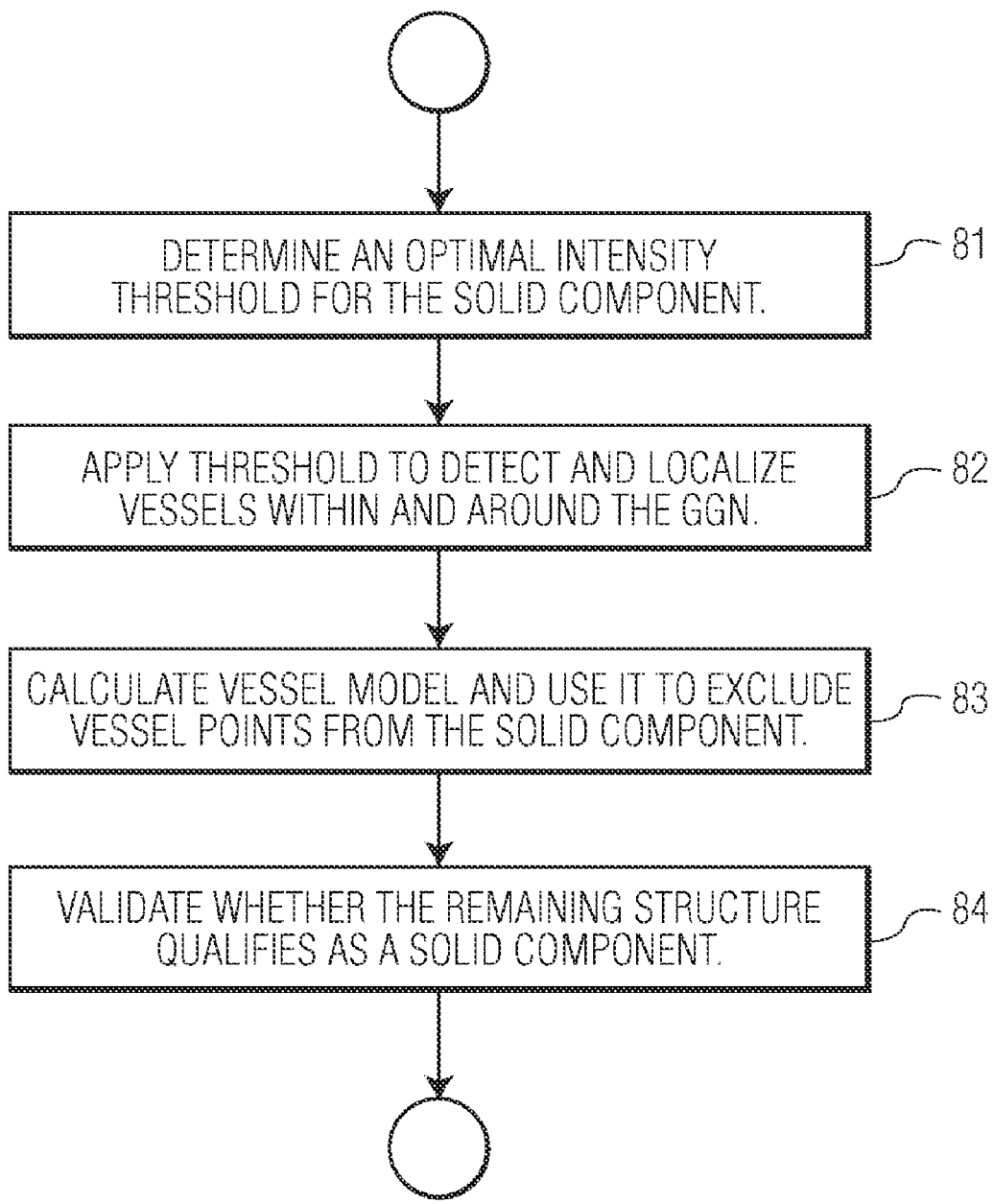
FIG. 8 is a flow chart of a method for the automated segmentation and estimation of the solid component percentage within a segmented ground glass lung nodule, according to an embodiment of the invention.

FIG. 8 is a flow chart of a method for the automated segmentation and estimation of the solid component percentage within a segmented ground glass lung nodule, according to an embodiment of the invention. Referring to the figure, after an entire GGN is segmented using a previously developed method, a first step 81 computes an optimal threshold. This GGN segmentation method is disclosed in U.S. patent application Ser. No. 11/189,288, "GGN segmentation in pulmonary images for accuracy and consistency" of Zhang, et al., filed on Jul. 26, 2005, the contents of which are herein incorporated by reference. Within the pre-segmented GGN, the threshold separating low density structures from high density structures is optimized by updating the mean values until both components are stabilized. A next step 82 includes applying this optimal threshold to the structure within the GGNs as well as to the surrounding structures, to localize any vessels passing through the nodule. Each vessel is then detected depending on its "elongation" and its proximity to the GGN. Then, at step 83, for each detected vessel, a model is computed based on its radius and orientation. The model extrapolates the vessel path within the GGN and then excludes the corresponding points from the segmentation. Finally, at step 84, whether the structure qualifies as SC is verified by estimating gradient distribution between the low density structure and the solid structure of the GGN. These steps are described in detail below.

Optimal Thresholding

Figure 9:
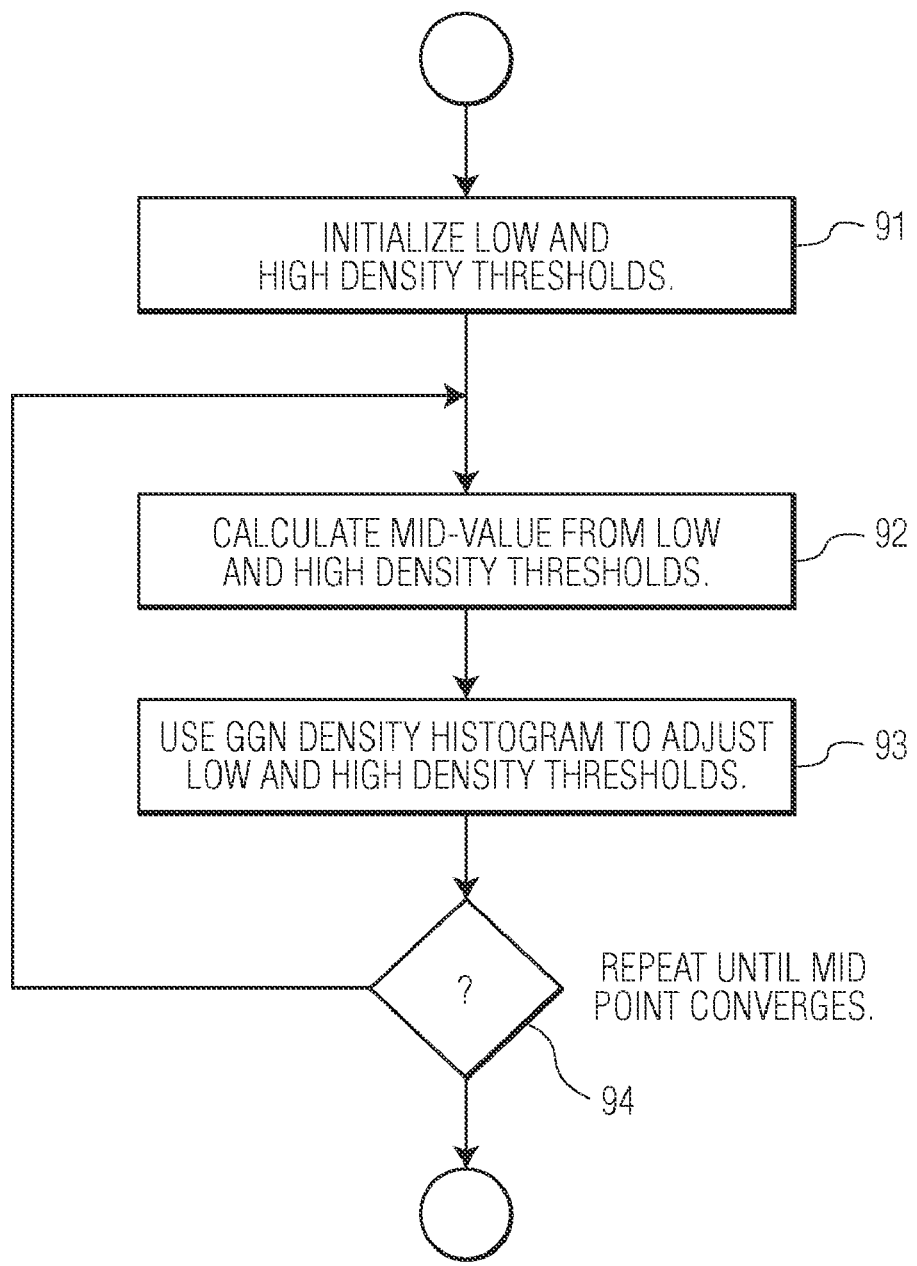
FIG. 9 is a flow chart of a method for determining an optimal solid component threshold, according to an embodiment of the invention.

An optimal threshold is used to best differentiate the solid component from the low-density component of the GGN. FIG. 9 is a flow chart of a method for determining an optimal solid component threshold, according to an embodiment of the invention. First, at step 91, two arbitrary thresholds are set that substantially correspond to the means of the 2 GGN components. An exemplary, non-limiting low-density threshold (lwT) is an intensity value of −724 Hounsfield units (HU), and an exemplary, non-limiting solid component threshold (scT) is −324 HU. Those two thresholds can be adjusted depending on the histogram amplitude of the GGNs.

From those two initial thresholds, a mid-value midv is defined at step 92 to separate the GGN between low and high density parts:

$$midv = \frac{lwT + scT}{2}.$$

Let i denote the CT image density, minI and maxI denote the minimum and maximum image density within the GGN segmentation, and H(i) be the GGN histogram of size (maxI−minI+1). H(i) can be used at step 93 to adjust a lwT and scT with:

$$lwT = \frac{\sum_{i=minI}^{midv-1} iH(i)}{\sum_{i=minI}^{midv-1} H(i)} \text{ and } scT = \frac{\sum_{i=midv}^{maxI} iH(i)}{\sum_{i=midv}^{maxI} H(i)}.$$

The value midv is then updated and the process repeated at step 94 until the convergence of the middle value midv. This middle value serves as an optimized threshold that differentiates the low density component from the solid component.

FIG. 1 illustrates a GGN histogram optimization according to an embodiment of the invention. Histogram is divided in two parts, part 11 with a lighter shadow and part 12 with a darker shadow. The low threshold 13 and high threshold 14 are indicated for, respectively, the lighter and darker regions. The optimal threshold 15 is adjusted based upon values of the low and high thresholds.

Vessel Detection

The GGN is composed of a solid component and a sub solid component which usually surrounds the solid one. The regions completely outside the GGN, including the surrounding vessels, and the structures that belong to the GGN and extend outside the GGN, need to be labeled. If a structure has contact with the GGN, it is considered as a possible vessel. Therefore, if a vessel is detected within the surrounding structures, an attempt is made to match it with the structures that are both in and out of the GGN. A match indicates a vessel that goes through the GGN and needs to be removed from the solid component segmentation.

Figure 10:
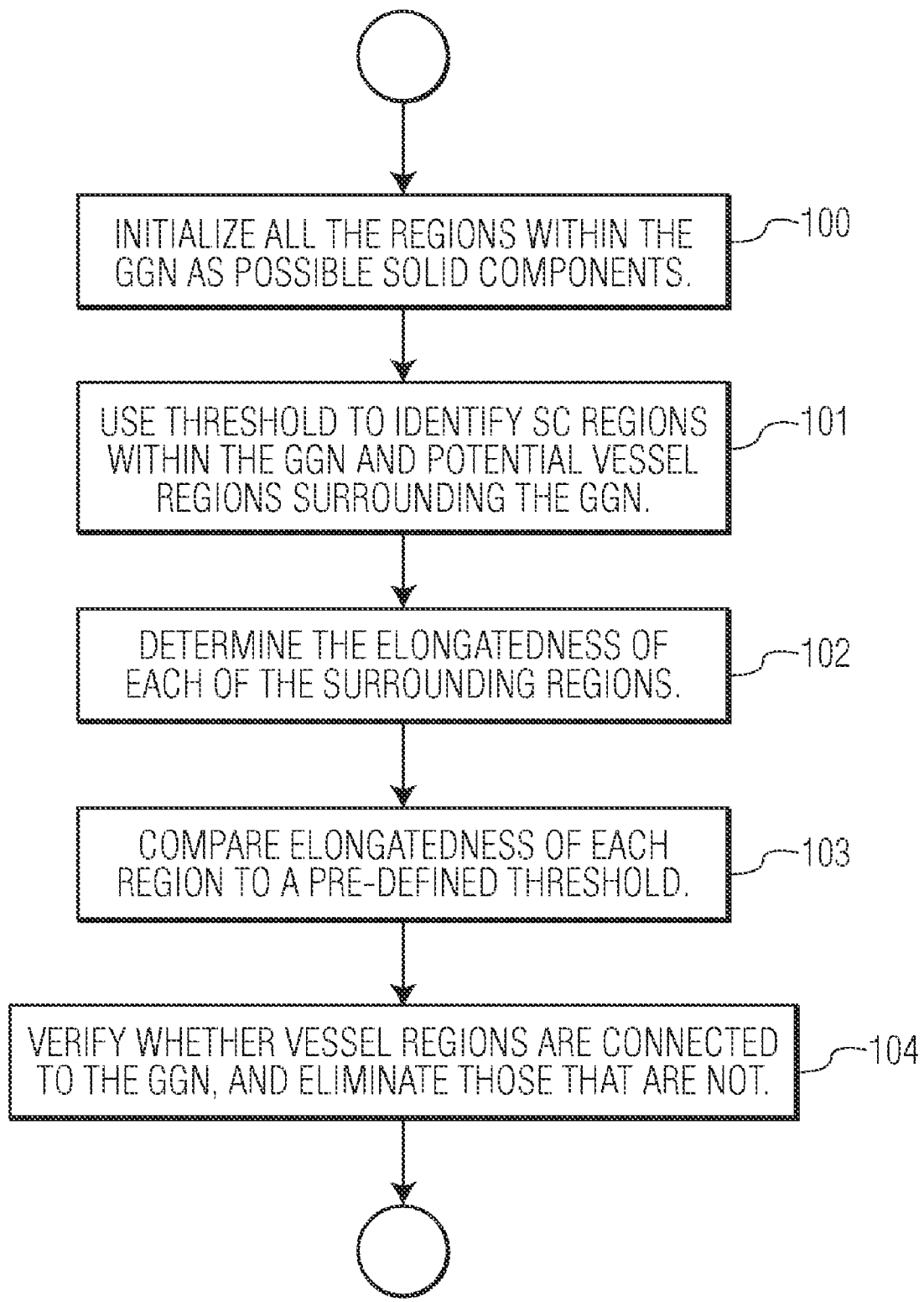
FIG. 10 is a flow chart of a method for detecting and localizing a vessel, according to an embodiment of the invention.

FIG. 10 is a flow chart of a method for detecting and localizing a vessel, according to an embodiment of the invention. Once an optimal threshold has been found, it can be applied to the entire GGN as well as to its surrounding structures to binarize the volume of interest. Referring to the figure, at step 100, according to an embodiment of the invention, all the regions within the GGN are initialized as a possible solid component. The idea is to determine whether a vessel is either passing by or through from the outside and then to find the corresponding region in the GGN. The regions are then labeled in two steps. The initial labeling concerns the sub-solid component. The threshold is applied to the GGN and the surrounding region to identify the high density regions including the solid component and any surrounding vessels. Then, the GGN region is masked out using the initial GGN segmentation and the remaining surrounding regions are analyzed.

Figure 2:
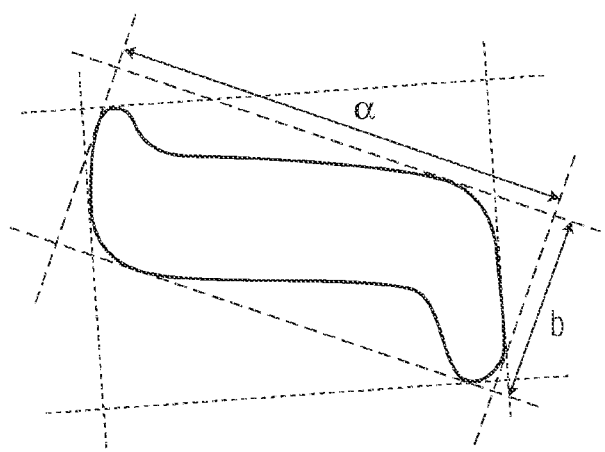
FIG. 2 illustrates the elongatedness of a bounding rectangle about a vessel, according to an embodiment of the invention.

The second labeling step, step 102, only concerns those regions that are outside of the GGN. In this labeling of surrounding regions, each thresholded region is reviewed to assess its similarity to vessels. It is assumed that a vessel should have an elongated shape. Thus, according to an embodiment of the invention, an "elongatedness" parameter is computed as an aspect ratio between the length and width of the region bounding rectangle. FIG. 2 illustrates the elongatedness of a bounding rectangle about a vessel, according to one embodiment of the invention, with length a and width b.

In an alternative embodiment of the invention, elongatedness can be defined by the region area and the square of its radius:

$$\text{elongatedness} = \frac{\text{Area}}{(2r)^2},$$

with r being the number of erosions that must be applied for the structure to completely disappear.

For each region, this elongatedness is compared at step 103 to a pre-defined threshold. The pre-defined threshold can be chosen experimentally. Then, the regions that are validated as vessels by the elongatedness parameter are checked against the first computed labeling map. It is verified at step 104 whether or not that these regions are indeed connected to the GGN, meaning that the regions could be vessels coming out from the GGN. A region that has been determined to have no connection to the GGN is eliminated from consideration.

Vessel Modeling

Figure 11:
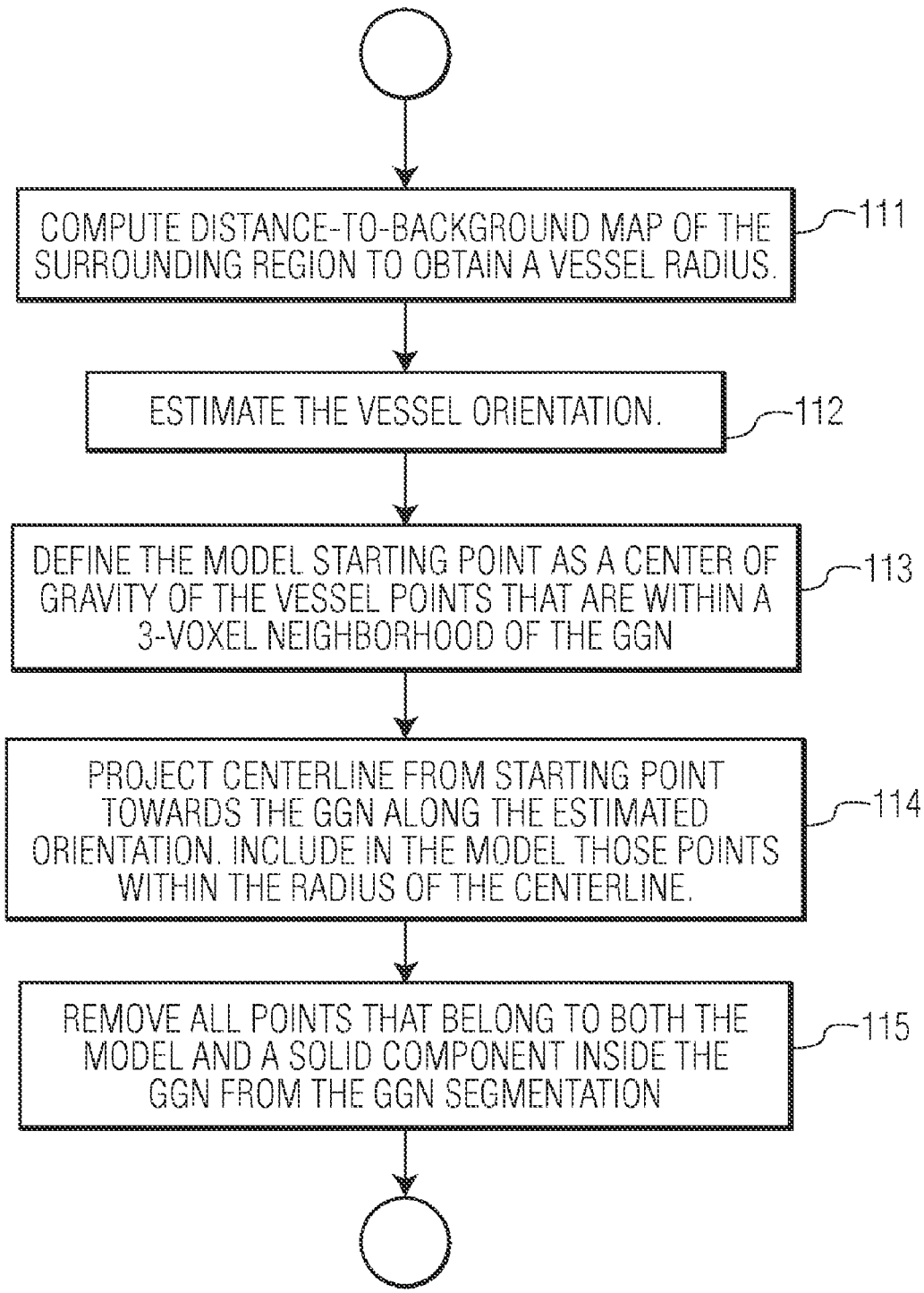
FIG. 11 is a flow chart of a method for vessel modeling, according to an embodiment of the invention.

For the remaining vessel regions that are connected to the GGN, a model of the vessel according to an embodiment of the invention is defined based on its radius and orientation. A flow chart of a method for vessel modeling, according to an embodiment of the invention, is presented in FIG. 11. A distance-to-background map of the region is computed at step 111 to obtain a radius of the cylindrical shaped vessel. The distance map d(M(x, y, z)) of a vessel point M(x, y, z) is defined as the minimum distance from M to the background. The vessel radius is then given by the maximum value of the distance-to-background map, which represents the distance from the center line of the vessel.

The orientation of the vessel is estimated at step 112 using the (3×3) covariance matrix $c_{ij}$ of the vessel points. The vessel points include all points in the interior of the vessel as well as the surface of the vessel. The eigenvectors of the matrix are computed. These eigenvalues correspond to the vessel principle axes. The vessel direction is obtained from the eigenvector with largest eigenvalue. The covariance matrix is computed by first calculating a matrix $X_{ij}$ of the variance of the coordinates (x, y, z) of vessel points defined as $X_{i0}=x_i-\bar{x}$, $X_{i1}=y_i-\bar{y}$, and $X_{i2}=z_i-\bar{z}$. The covariance matrix of the vessel is then expressed as $$c_{ij} = \frac{1}{N-1}(X_i \cdot X_j^T), \forall i, j \in Z, i, j, \in [0, 2],$$

where $\bar{x}$, $\bar{y}$, and $\bar{z}$, are the means of N vessel coordinates x, y and z. Eigenvectors and eigenvalues are obtained by decomposition of the covariance matrix.

At step 113, a central location is defined as a center of gravity of the vessel points that are within a small neighborhood of the GGN. An exemplary, non-limiting small neighborhood would be those points within about 3-voxels of the GGN. This central location becomes a starting point for a 3D model. From this central location or center of gravity, at step 114, a centerline towards the GGN is projected in a region of interest along the orientation computed from the eigenvectors, and points surrounding the center line within the pre-computed radius in the 3D space are included in the model.

This centerline can also be extrapolated from the original 3D centerline of the vessel, and by using a B-spline for defining the interpolated points.

At step 115, all points that belong to both the model and a solid component inside the GGN are removed from the GGN segmentation. After the vessel is removed from the GGN using the extrapolated path given by the model, there are usually a few pixels left that were not in the path of the model, but that should have been excluded from the GGN. For each 2D slice in the 3D model, pixels around the model are evaluated as to whether or not they should be included. The evaluation is based on proximity to the model, that is, whether the region formed by the pixels touches the model path, and also on the number of pixels defining a region. Only small regions are considered to ensure that a solid component is not excluded. An exemplary, non-limiting region size considered for extraction is less than about 5 voxels, however, this number can be arbitrarily determined by a user. A few isolated points will be excluded but mid-size regions of points will not.

Figure 3A:
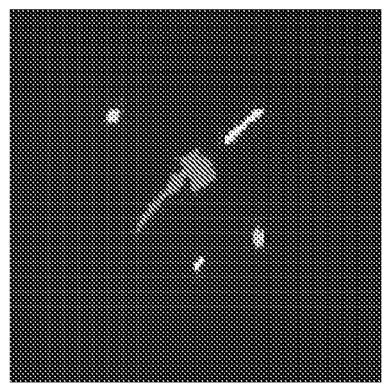
FIGS. 3(a)-(d) illustrate the use of vessel modeling to remove a vessel from an SC, according to an embodiment of the invention.
Figure 3B:
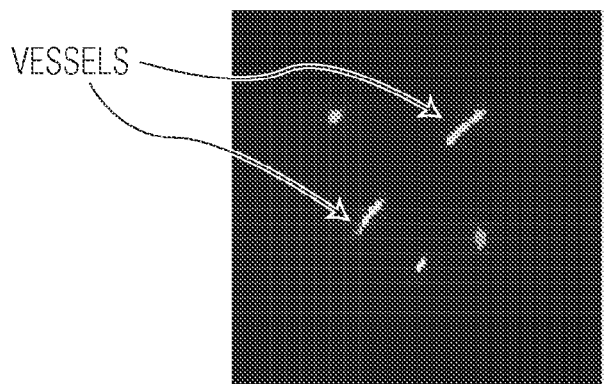
Figure 3C:
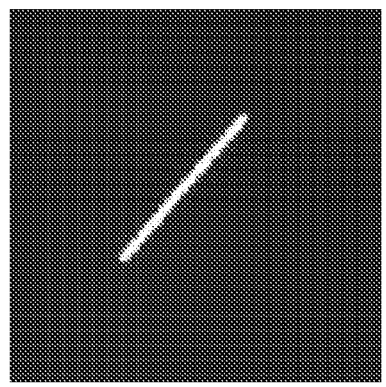
Figure 3D:
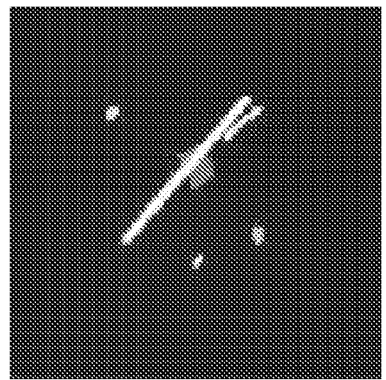

FIGS. 3(a)-(d) illustrate the use of vessel modeling to remove a vessel from an SC. FIG. 3(a) shows a Solid Component in Dark Gray with the surrounding structures, while FIG. 3(b) depicts the surrounding structures. Two elongated structures (vessels) in FIG. 3(b) are indicated by arrows. FIG. 3(c) represents the vessel model created from one of the elongated structures, and FIG. 3(d) illustrates the model superimposed on the GGN to remove the vessel branch from the solid component.

Validation of the Existence of Solid Component

Since the solid components have clear boundaries separating them from the surrounding ground glass part, the gradient for each point on the contour of the segmented solid component can be analyzed to check if the segmentation provides sufficient contrast. A large gradient is expected along the boundary between solid components and surrounding ground glass portions. To compensate for the partial volume effect, the gradient is analyzed for each boundary point along a profile perpendicular to the boundary contour of the segmentation.

Figure 12:
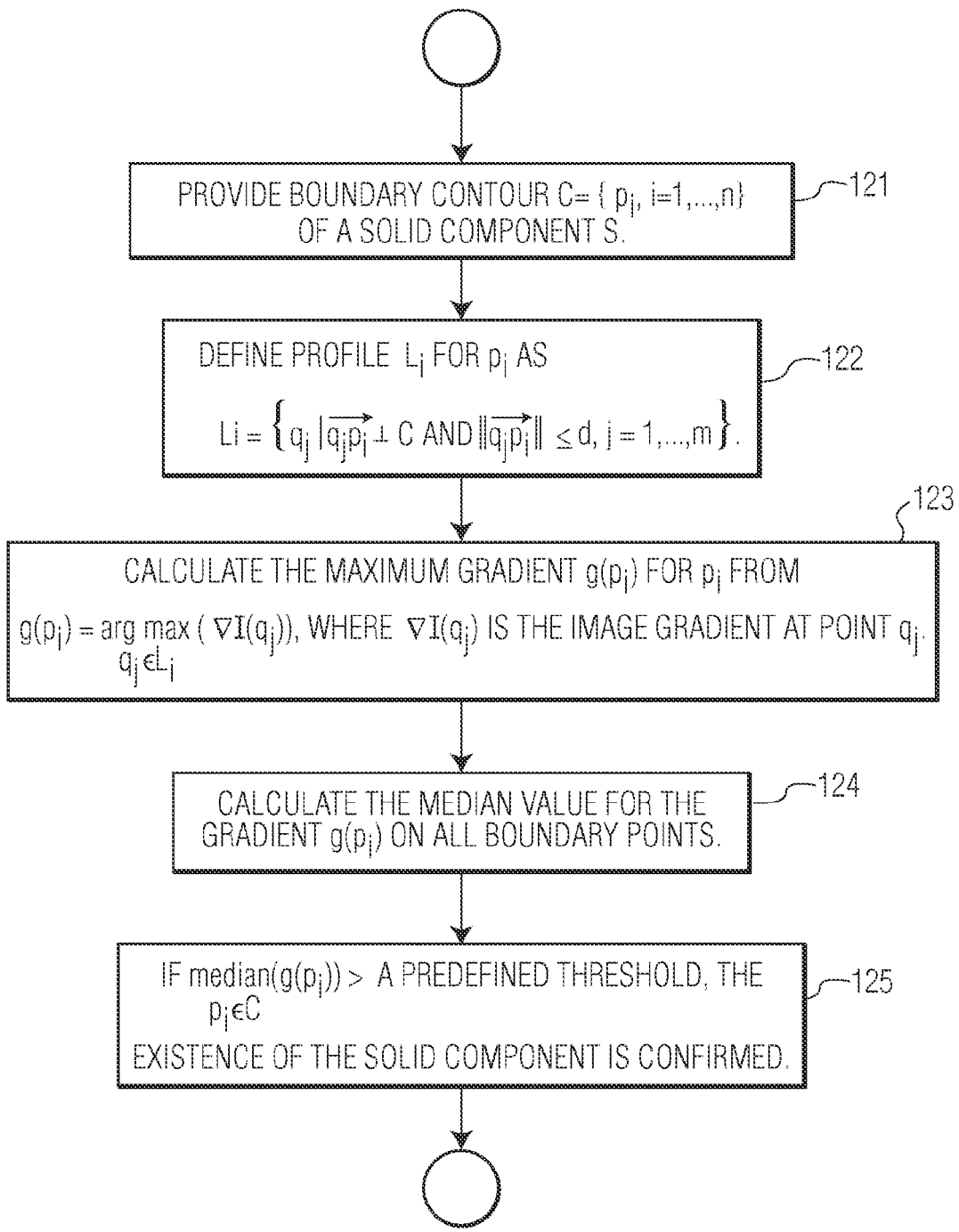
FIG. 12 is a flow chart of a method for SC validation, according to an embodiment of the invention.

FIG. 12 is a flow chart of a method for SC validation, according to an embodiment of the invention. Referring to the figure, at step 121, let C={$p_i$, i=1, . . . , n} be the boundary contour of a solid component S. The shape of the solid components is obtained from applying the threshold to the VOI. After the vessel model is applied, high-density region left in the GGN is a solid component. To get the contour, any contouring algorithm could work, such as the Code Chain algorithm, or the Hough Transform algorithm. Code Chain is useful here because it provides an orientation from one contour point to the next, so that one can easily obtain the normal to the contour to compute the gradient. Note that the contour is a closed line. Then the profile $L_i$ for $p_i$ is defined at step 122 as:

$$L_i = \{q_j | \vec{q_j p_i} \perp C \text{ and } \|\vec{q_j p_i}\| \leq d, j=1, \ldots, m\},$$

where $\vec{q_j p_i}$ is the vector from $q_j$ to $p_i$, $\|\vec{q_j p_i}\|$ is the magnitude of vector $\vec{q_j p_i}$, and d is the half-length of the profile. An exemplary, non-limiting half-length is about 2 pixels. At step 123, the maximum gradient $g(p_i)$ for $p_i$ is calculated over $L_i$:

$$g(p_i) = \underset{q_j \in L_i}{\arg\max}(\nabla I(q_j))$$

where $\nabla I(q_j)$ is the gradient of image intensity at point $q_j$. Then the median value for the gradient $g(p_i)$ on all boundary points, $$\underset{p_i \in C}{\text{median}}(g(p_i)),$$

is computed at step 124. If, at step 125, $$\underset{p_i \in C}{\text{median}}(g(p_i))$$

is greater than a pre-defined threshold, it is assumed the solid component segmentation S has enough contrast compared to the surrounding region, and the existence of the solid component is confirmed.

Figure 4A:
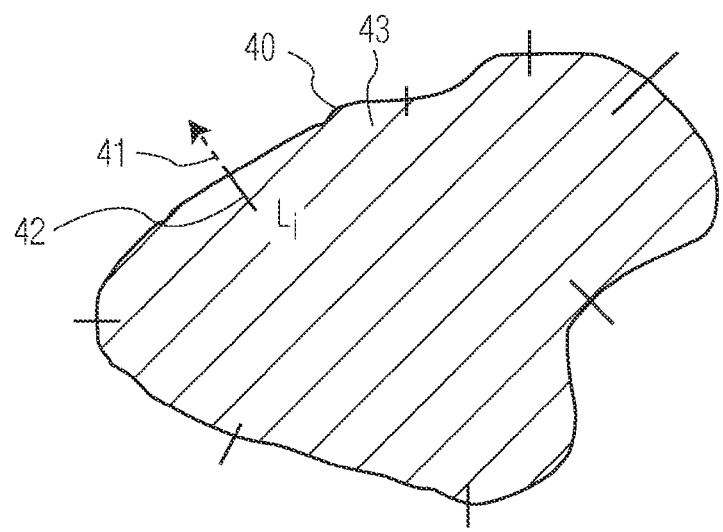
FIGS. 4(a)-(b) illustrate the use of profiles and gradient analysis for validation of the solid component, according to an embodiment of the invention.
Figure 4B:
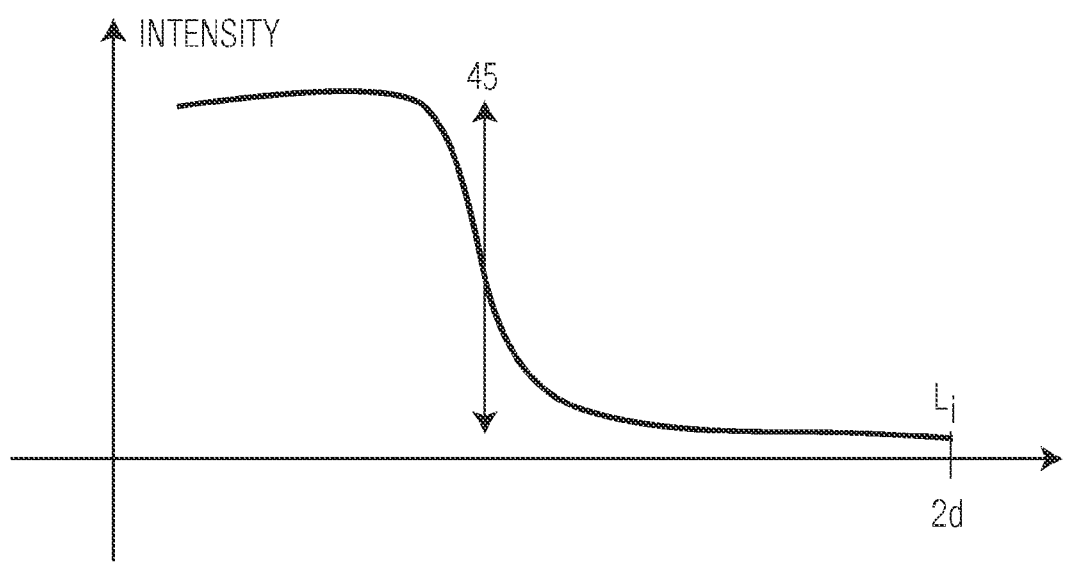

FIGS. 4(a)-(b) illustrate the use of profiles and gradient analysis for validation of the solid component. FIG. 4(a) depicts a solid component 43 with a boundary contour 40 with a vector $\vec{q_j p_i}$ 41 indicated by an arrow shown projecting normal from the boundary contour 40 to define the profile $L_i$ 42, and FIG. 4(b) is a graph of the intensity of profile $L_i$ as a function of length. A large gradient 45 is indicated where the intensity value changes suddenly.

Results

A method according to an embodiment of the invention was applied to 7 mixed GGNs from 5 patients followed at multiple time points, resulting in 15 separate datasets with mixed GGNs. Computed tomography (CT) scans were of two types: whole lung scans with in-plane resolution of about 0.5 to 0.6 mm, and target reconstructions (partial lungs) with in-plane resolution of about 0.3 to 0.35 mm. Slice spacing was 1 mm for both types of scans. Fifteen synthetic datasets were created for further tests, by adding solid nodules to pure GGNs, with scale adjustments to fit inside the GGNs. The segmentation results were scored according to the following categories: A, segmentation fully satisfied; B, acceptable with no manual correction; and C, failed, manual correction is needed. Finally, the performance of the automated determination of SC was evaluated with 20 GGNs without SC and the 15 real GGNs with SC.

Figure 5A:
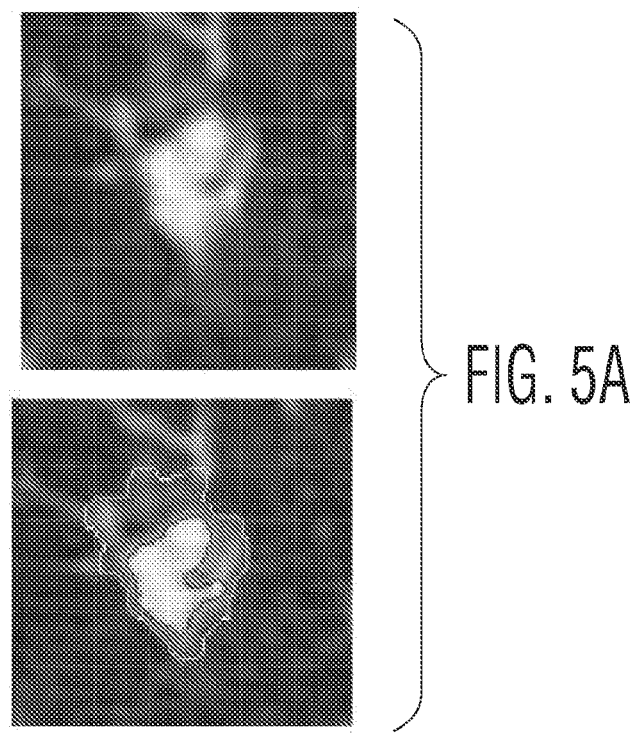
FIGS. 5(a)-(c) illustrate the classification of segmentation results, according to an embodiment of the invention.
Figure 5B:
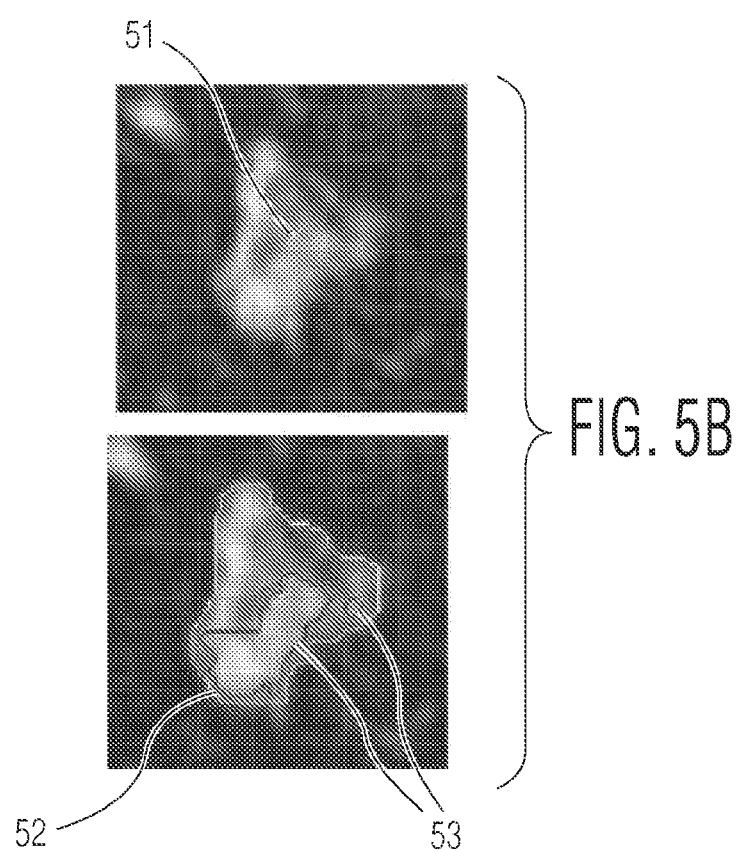
Figure 5C:
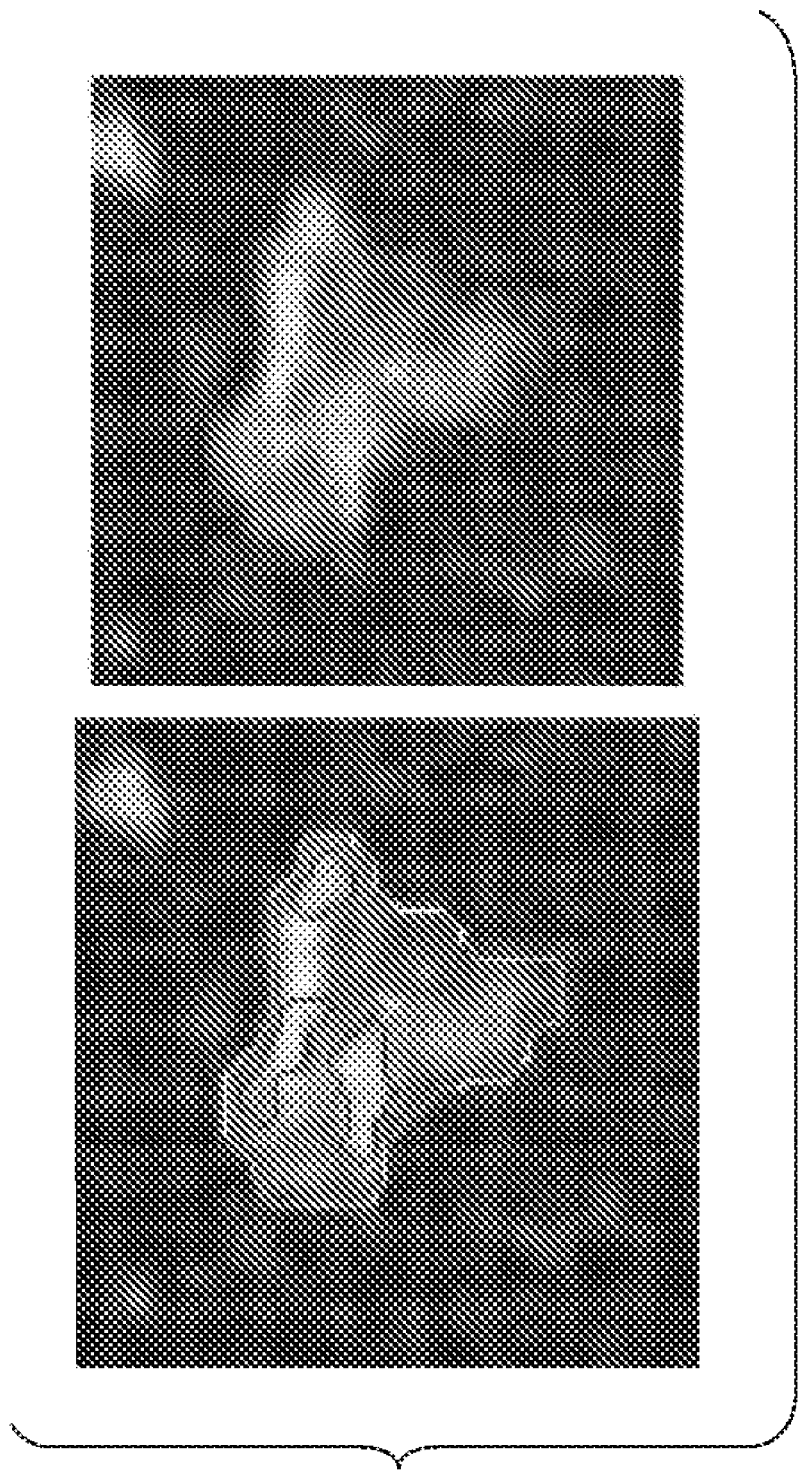

FIGS. 5(a)-(c) illustrate the classification of segmentation results. Referring to the figure, the top row shows the unsegmented image, and the bottom row shows the resulting segmentation. The crosses 51 in the center of each top row image represent click points where a user selected a GGN. In the bottom row, the outer contours 52 represent the GGN boundaries, while the inner contours 53 represent the SC boundaries. For clarity, only the images in column 5(b) are labeled. The segmentation is fully satisfactory in FIG. 5(a), acceptable, with no manual adjustments required in FIG. 5(b), and failed, with manual correction required, in FIG. 5(c). The result in FIG. 5c was obtained from unsuccessful earlier attempts to develop an automatic method.

Figure 6A:
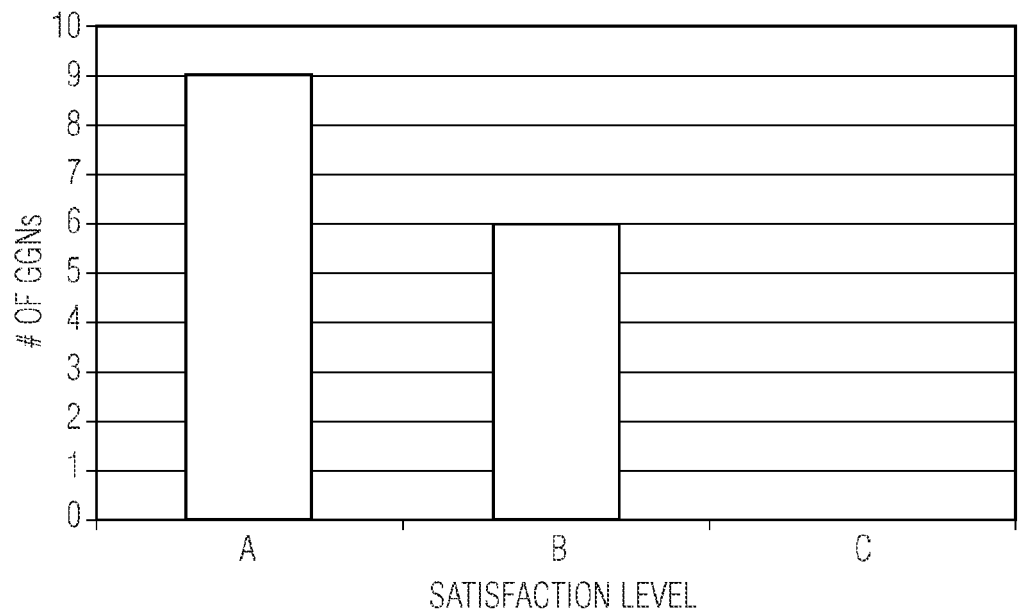
FIGS. 6(a)-(b) are bar graphs illustrating the GGN classification upon scoring for the Real and synthetic GGNs datasets, according to an embodiment of the invention.
Figure 6B:

Segmentation results of the 15 real GGNs showed that 60% were classified with score A, 40% with score B and 0% with score C. No manual modifications were deemed necessary when employing the final algorithm. Using the 15 synthetic datasets, 66.7% were classified with score A, 33.3% with score B and 0% with score C. For the automated determination of SC, an algorithm according to an embodiment of the invention returned 15 non-empty volumes for the 15 real GGNs with SC, and 15 empty volumes out of the 20 GGNs without SC, yielding a sensitivity of 100% and specificity of 75%. FIGS. 6(a)-(b) are bar graphs illustrating the GGN classification upon scoring for the Real and synthetic GGNs datasets. The abscissa of the bar graphs represent actual numbers, not percentages. For each case, there were a total of 15 GGNs.

Figure 7A:
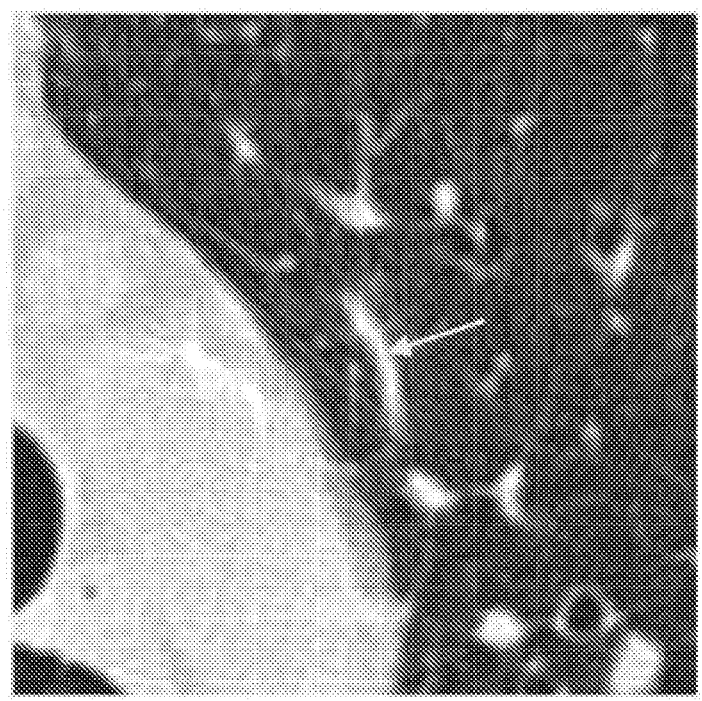
FIGS. 7(a)-(b) illustrate further examples of Solid Component segmentation, according to an embodiment of the invention.
Figure 7B:
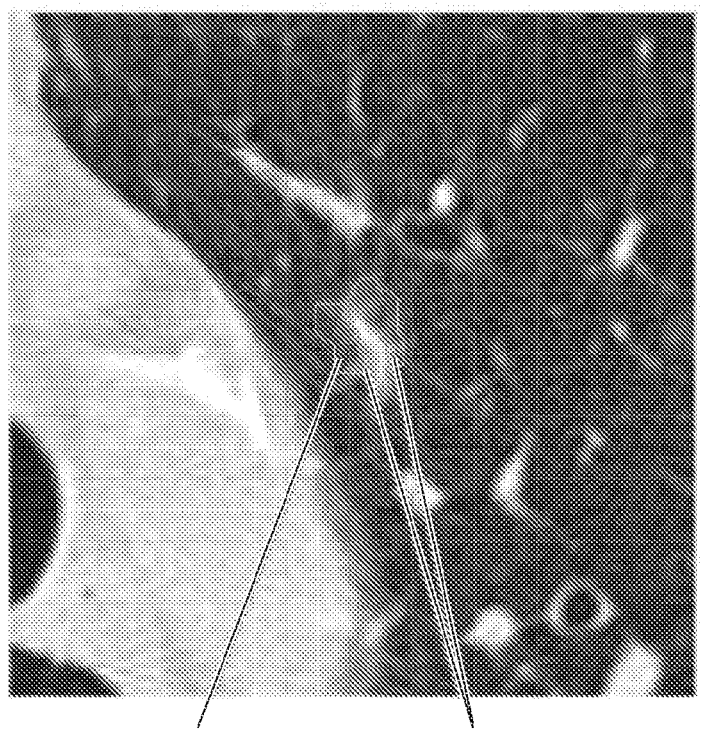

FIGS. 7(a)-(b) illustrate further examples of Solid Component segmentation. FIG. 7(a) depicts a slice with a vessel, indicated by the arrow, and FIG. 7(b) shows how the vessel model prevents the segmentation from erroneously including the vessel in the GGN. The outer contour 71 in FIG. 7(b) is the GGN boundary, while the inner contour 72 is the SC boundary.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 13:
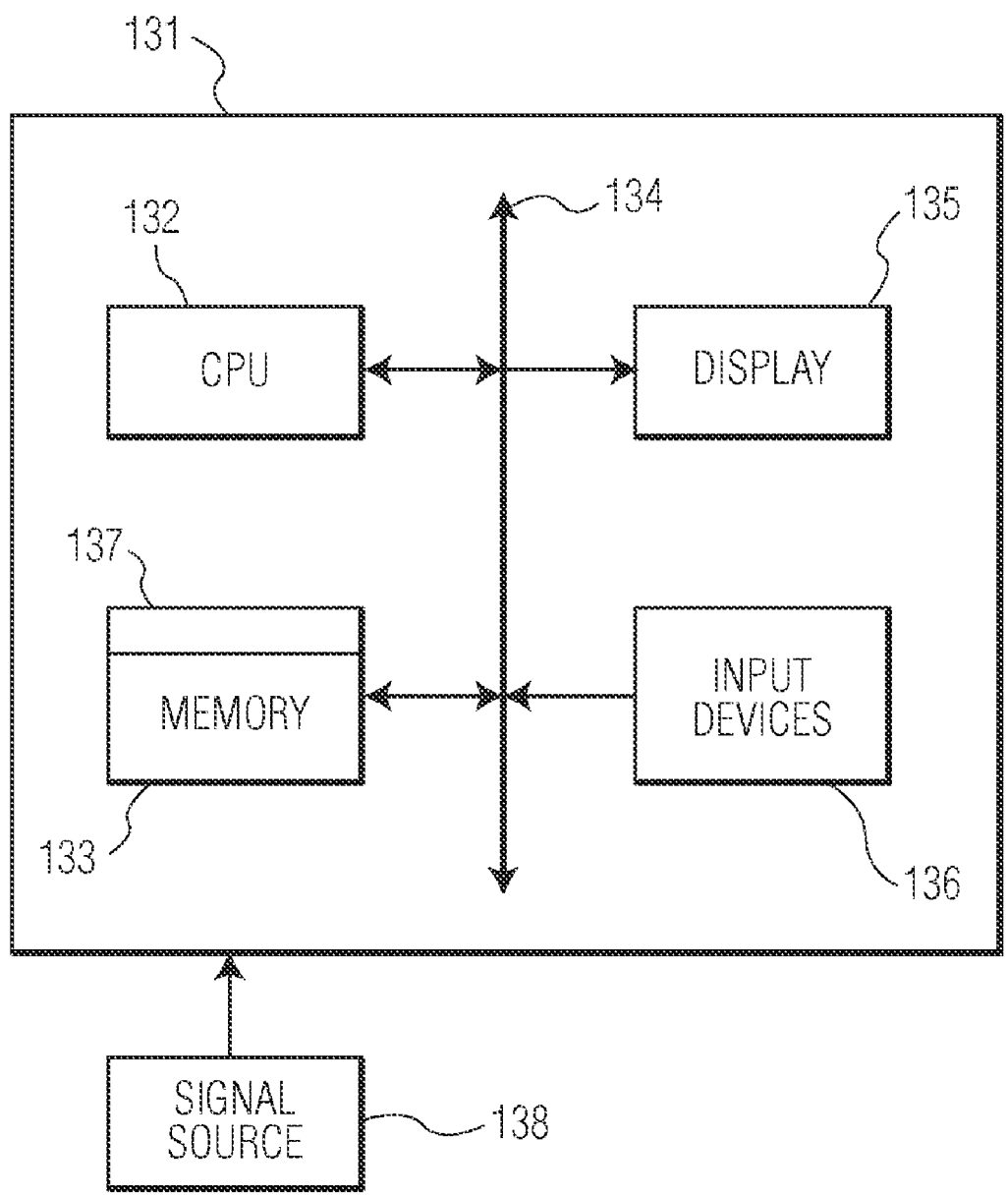
FIG. 13 is a block diagram of an exemplary computer system for implementing a method for automated segmentation and estimation of the solid component percentage within a segmented ground glass lung nodule, according to an embodiment of the invention.

FIG. 13 is a block diagram of an exemplary computer system for implementing a method for the automated segmentation and estimation of the solid component percentage within a segmented ground glass lung nodule, according to an embodiment of the invention. Referring now to FIG. 13, a computer system 131 for implementing the present invention can comprise, inter alia, a central processing unit (CPU) 132, a memory 133 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present invention can be implemented as a routine 137 that is stored in memory 133 and executed by the CPU 132 to process the signal from the signal source 138. As such, the computer system 131 is a general purpose computer system that becomes a specific purpose computer system when executing the routine 137 of the present invention.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for segmenting a solid component (SC) in a ground glass nodule (GGN), the method comprising the steps of:
   providing a digitized image that includes a segmented GGN, said image comprising a plurality of intensities corresponding to a 3-dimensional grid of points;
   computing an intensity threshold that distinguishes a high intensity solid component of said GGN from a low intensity non-solid component, and applying said intensity threshold to identify a SC of said GGN and to identify regions of interest around the GGN;
   detecting whether or not a region of interest is a vessel;
   calculating a model for a detected vessel based on a radius and orientation of said vessel, and removing from said GGN segmentation all points that belong to both the model and said SC inside said GGN; and
   verifying whether a structure resulting from excluding said points qualifies as an SC.

2. The method of claim 1, wherein computing an intensity threshold comprises:
   initializing a low intensity threshold and a high intensity threshold from an intensity histogram of said GGN;
   calculating a mid-value as an average of said low intensity threshold and said high intensity threshold;
   adjusting said low intensity threshold according to $$\frac{\sum_{i=\min I}^{midv-1} iH(i)}{\sum_{i=\min I}^{midv-1} H(i)},$$

and said high intensity threshold according to $$\frac{\sum_{i=midv}^{\max I} iH(i)}{\sum_{i=midv}^{\max I} H(i)},$$

wherein midv is said mid-value, i is an image intensity value, minI and maxI are minimum and maximum image intensities within the GGN segmentation, and H(i) is a GGN histogram of size (maxI−minI+1); and
   repeating said steps of calculating a mid-value and adjusting said low and high intensity thresholds until said mid-value converges, wherein said mid-value is an intensity threshold for said SC.

3. The method of claim 1, wherein detecting whether or not a region of interest is a vessel comprises:
   calculating an elongatedness of each region of interest labeled as a possible vessel; and
   comparing said elongatedness parameter for said region to a pre-determined threshold, wherein if said region is determined to be a vessel, verifying whether or not said region is connected to the GGN, and eliminating said region from consideration if it has no connection to the GGN.

4. The method of claim 3, wherein said elongatedness is computed as an aspect ratio of a length and width of a rectangle that bounds said labeled region.

5. The method of claim 3, wherein said elongatedness is computed from $$\frac{\text{Area}}{(2r)^2},$$

wherein Area is a region area and r is a number of erosions needed for the region to disappear.

6. The method of claim 1, wherein calculating a model for a detected vessel comprises:
   determining a radius and orientation of said detected vessel;
   defining a starting point from a center of gravity of a neighborhood of vessel points near said GGN;
   projecting a centerline from said starting point towards said GGN along said orientation direction; and
   including in said model those points surrounding the center line within said radius.

7. The method of claim 6, wherein said radius is computed from a maximum value of a distance-to-background map of said detected vessel, and said orientation is determined from a largest eigenvalue of a (3×3) covariance matrix $c_{ij}$ of vessel points.

8. The method of claim 6, further comprising, for each 2D slice in said model, evaluating a remaining region around the model for inclusion in said model based on whether said remaining region touches said model, and on the number of pixels defining said remaining region.

9. The method of claim 1, wherein verifying whether a resulting structure qualifies as an SC comprises:
   obtaining a boundary contour $C=\{p_i, i=1, \ldots, n\}$ of said solid component;
   defining a profile $L_i$ for $p_i$ as $$L_i = \{q_j | \overrightarrow{q_j p_i} \perp C \text{ and } \|\overrightarrow{q_j p_i}\| \leq d, j=1, \ldots, m\},$$

wherein $\overrightarrow{q_j p_i}$ is a vector from $q_j$ to $p_i$, $\|\overrightarrow{q_j p_i}\|$ is the magnitude of vector $\overrightarrow{q_j p_i}$, and d is a half length of the profile;
   calculating an image intensity gradient $\nabla I(q_j)$ for each point $q_j$;
   calculating a maximum gradient $g(p_i)$ over $L_i$ from $$g(p_i) = \underset{q_j \in L_i}{\operatorname{argmax}}(\nabla I(q_j));$$

calculating a median value for the gradient $g(p_i)$ on all boundary points $p_i$, wherein if said median is greater than a pre-defined threshold, said resulting structure is confirmed as a solid component.

10. A method for segmenting a solid component (SC) in a ground glass nodule (GGN), the method comprising the steps of:
   providing a digitized image that includes a segmented GGN, said image comprising a plurality of intensities corresponding to a 3-dimensional grid of points;
   computing an intensity threshold that distinguishes a high intensity solid component of said GGN from a low intensity non-solid component;
   initializing all points in the GGN as SC;
   using said intensity threshold to label the SC of the GGN from the non-SC part;
   using said intensity threshold to label regions of interest around the GGN as possible vessels;

calculating an elongatedness of each region labeled as a possible vessel;

comparing said elongatedness parameter for said region to a pre-determined threshold, wherein if said region is determined to be a vessel, verifying whether or not said region is connected to the GGN, and eliminating said region from consideration if it has no connection to the GGN.

11. The method of claim 10, further comprising calculating a radius and orientation of said vessel, defining a model starting point from a center of gravity of a neighborhood of vessel points near said GGN, projecting a model centerline from said starting point towards said GGN along said orientation direction, including in said model those points surrounding a center line within said radius, and removing from said GGN segmentation all points that belong to both the model and said SC inside said GGN.

12. The method of claim 10, further comprising estimating a gradient distribution between said high intensity component and said low intensity component of said GGN along a boundary contour of said GGN, wherein if a median value of said gradient is greater than a pre-defined threshold, verifying said resulting structure as a solid component.

13. A non-transitory program storage device readable by a computer, tangibly embodying a program of instructions executable by the computer to perform the method steps for segmenting a solid component (SC) in a ground glass nodule (GGN), the method comprising the steps of:

providing a digitized image that includes a segmented GGN, said image comprising a plurality of intensities corresponding to a 3-dimensional grid of points;

computing an intensity threshold that distinguishes a high intensity solid component of said GGN from a low intensity non-solid component, and applying said intensity threshold to identify a SC of said GGN and to identify regions of interest around the GGN;

detecting whether or not a region of interest is a vessel;

calculating a model for a detected vessel based on a radius and orientation of said vessel, and removing from said GGN segmentation all points that belong to both the model and said SC inside said GGN; and verifying whether a structure resulting from excluding said points qualifies as an SC.

14. The computer readable program storage device of claim 13, wherein computing an intensity threshold comprises:

initializing a low intensity threshold and a high intensity threshold from an intensity histogram of said GGN;

calculating a mid-value as an average of said low intensity threshold and said high intensity threshold;

adjusting said low intensity threshold according to $$\frac{\sum_{i=\min I}^{midv-1} iH(i)}{\sum_{i=\min I}^{midv-1} H(i)},$$

and said high intensity threshold according to $$\frac{\sum_{i=midv}^{\max I} iH(i)}{\sum_{i=midv}^{\max I} H(i)},$$

wherein midv is said mid-value, i is an image intensity value, minI and maxI are minimum and maximum image intensities within the GGN segmentation, and $H(i)$ is a GGN histogram of size (maxI−minI+1); and repeating said steps of calculating a mid-value and adjusting said low and high intensity thresholds until said mid-value converges, wherein said mid-value is an intensity threshold for said SC.

15. The computer readable program storage device of claim 13, wherein detecting whether or not a region of interest is a vessel comprises:

calculating an elongatedness of each region of interest labeled as a possible vessel; and comparing said elongatedness parameter for said region to a pre-determined threshold, wherein if said region is determined to be a vessel, verifying whether or not said region is connected to the GGN, and eliminating said region from consideration if it has no connection to the GGN.

16. The computer readable program storage device of claim 15, wherein said elongatedness is computed as an aspect ratio of a length and width of a rectangle that bounds said labeled region.

17. The computer readable program storage device of claim 15, wherein said elongatedness is computed from $$\frac{\text{Area}}{(2r)^2},$$

wherein Area is a region area and r is a number of erosions needed for the region to disappear.

18. The computer readable program storage device of claim 13, wherein calculating a model for a detected vessel comprises:

determining a radius and orientation of said detected vessel;

defining a starting point from a center of gravity of a neighborhood of vessel points near said GGN;

projecting a centerline from said starting point towards said GGN along said orientation direction; and including in said model those points surrounding the center line within said radius.

19. The computer readable program storage device of claim 18, wherein said radius is computed from a maximum value of a distance-to-background map of said detected vessel, and said orientation is determined from a largest eigenvalue of a (3×3) covariance matrix $c_{ij}$ of vessel points.

20. The computer readable program storage device of claim 18, the method further comprising, for each 2D slice in said model, evaluating a remaining region around the model for inclusion in said model based on whether said remaining region touches said model, and on the number of pixels defining said remaining region.

21. The computer readable program storage device of claim 13, wherein verifying whether a resulting structure qualifies as an SC comprises;

obtaining a boundary contour $C=\{p_i, i=1, \ldots, n\}$ of said solid component;

defining a profile $L_i$ for $p_i$ as $$L_i = \{q_j | \overrightarrow{q_j p_i} \perp C \text{ and } \|\overrightarrow{q_j p_i}\| \leq d, j=1, \ldots, m\},$$

wherein $\overrightarrow{q_j p_i}$ is a vector from $q_j$ to $p_i$, $\|\overrightarrow{q_j p_i}\|$ is the magnitude of vector $\overrightarrow{q_j p_i}$, and d is a half length of the profile;

calculating an image intensity gradient $\nabla I(q_j)$ for each point $q_j$;

calculating a maximum gradient $g(p_i)$ over $L_i$ from $$g(p_i) = \underset{q_j \in L_i}{\operatorname{argmax}}(\nabla I(q_j));$$

calculating a median value for the gradient $g(p_i)$ on all boundary points $p_i$, wherein if said median is greater than a pre-defined threshold, said resulting structure is confirmed as a solid component.

* * * * *